Dec. 10, 1963   R. H. NEWTON   3,113,913
SEALING AND PURGING SYSTEM FOR PRESSURIZED WATER REACTOR
Filed Dec. 14, 1959
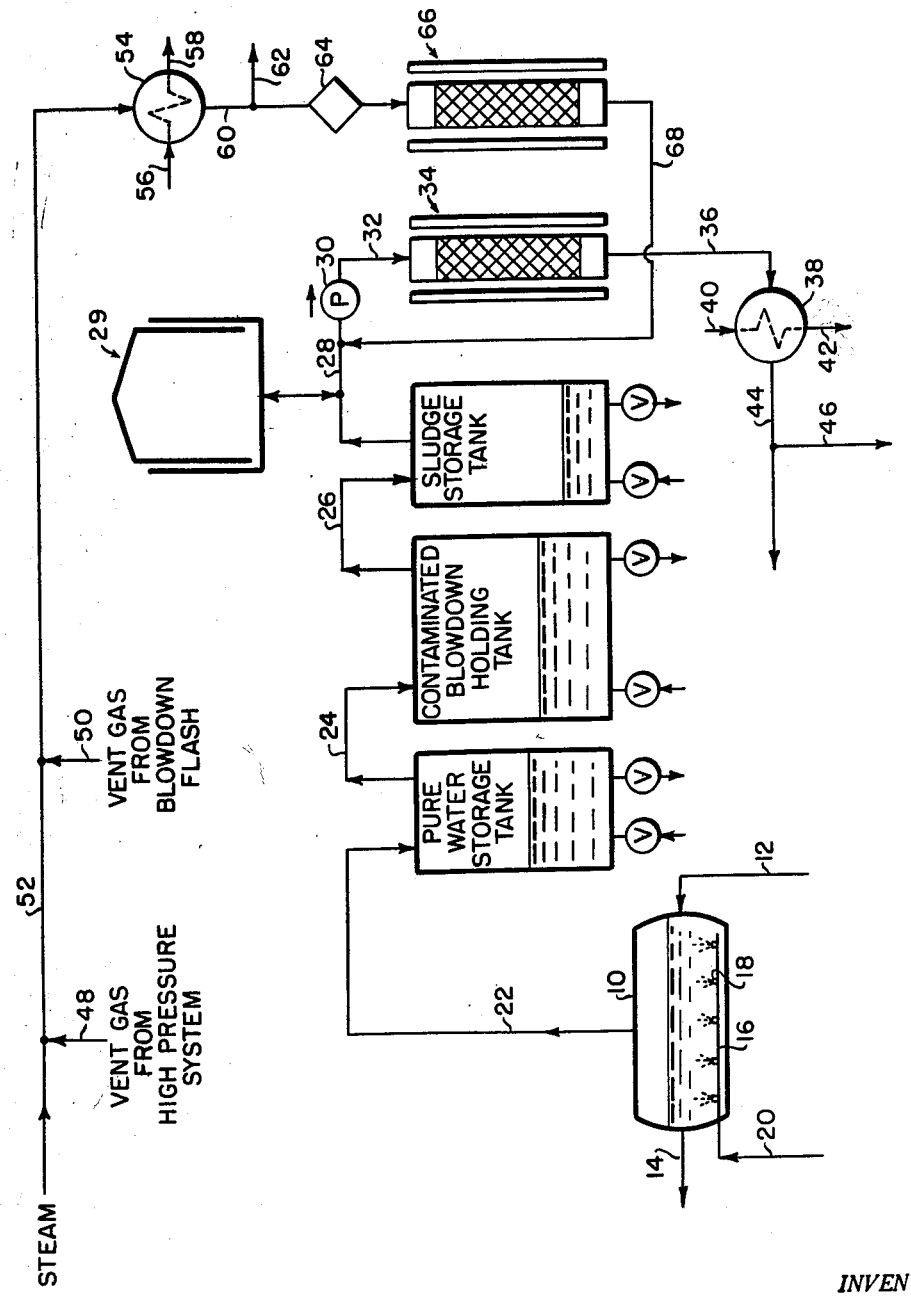
INVENTOR.
ROGER H. NEWTON
BY
*Kenway, Jenney, Witter & Hildreth*
ATTORNEYS United States Patent Office 3,113,913
Patented Dec. 10, 1963

3,113,913
SEALING AND PURGING SYSTEM FOR
PRESSURIZED WATER REACTOR
Roger H. Newton, Winchester, Mass., assignor to The Badger Company, Inc., a corporation of Massachusetts
Filed Dec. 14, 1959, Ser. No. 859,210
6 Claims. (Cl. 204—154.2)

This invention relates to nuclear reactors and, more particularly, to a novel and improved sealing and purging system for a pressurized water reactor.

In the operation of a pressurized water reactor system it has been found that from a nuclear standpoint, i.e., n, γ reactions, the presence of any gas except hydrogen or helium in the primary coolant water is a disadvantage. Accordingly, it is desirable to provide make-up feed water for the reactor which has as low a content of dissolved gases, except hydrogen or helium, as is possible. The storage of such feed water presents particular difficulty, inasmuch as the commonly used and available storage vessels are of the rigid wall type wherein a void or gas space occurs when the vessel is not completely filled with a liquid. In order to maintain this gas space free of contaminants, it is a known practice to maintain this space in the storage vessel filled with a relatively inert gas such as nitrogen and to remove the dissolved gas from solution immediately prior to pumping the water into the primary system. The disadvantage of such a procedure is obvious in that it requires additional equipment for removal of the nitrogen and may require decay storage facilities for the nitrogen.

It is one of the objects of this invention to provide a novel and improved method and apparatus for maintaining the purity of primary feed water while in storage which will eliminate the necessity for degassing of the water prior to use.

It is also customary to provide gas purging of the storage tanks for contaminated liquids and sludge resulting from normal operation of the reaction. A known present practice is to purge these storage tanks with air which collects large amounts of radioactive material. The contaminated air cannot be destroyed or released into the atmosphere and so must be stored for a prolonged decay period before disposition of it may be made. As will be apparent, the storage of this contaminated air presents a problem from a space, and thus a facility expense, standpoint.

It is, accordingly, another object of this invention to provide a novel and improved method and apparatus for gas purging and sealing of contaminated liquid and sludge storage vessels which will not require large storage facilities for decay storage of the sealing gas.

Further, in the operation of a pressurized water reactor system, it is necessary to purge or blow down the primary loop system, as has been described by the Biladeau (Industrial and Engineering Chemistry, vol. 48, pages 2151 to 2161) and by Lyon and Reynolds (Nucleonics, vol. 13, No. 10, pages 60 to 62). Especially if hydrogen is added to control radiolysis (see Reactor Handbook, Atomic Energy Commission, vol. II, page 187), the purge will consist in part of gas or vapor. These gases contain radioactive materials, the origin of which is not certainly known, but they could be fission products that leak from the fuel. Storage for an adequate decay period of these radioactive contaminated gases from the primary loop vent and blowdown flash is necessary before disposal of these gases can be accomplished. The length of the necessary storage period and the usual quantity of these gases are both sufficient to make it necessary to provide undesirably large storage areas.

Accordingly, it is another object of this invention to provide novel and improved method and apparatus for reducing the quantity of radioactive primary loop vent and blowdown gases which must be stored.

The objects of this invention are achieved in a water reactor system including a plurality of storage tanks for containing materials or substances such as pure feed water, blowdown residue, spent resin and sludge from the purifying of blowdown water for use as primary feed water, etc. In accordance with the invention, hydrogen gas is passed through the void spaces above the material in the storage tank in series and in ascending order of the degree of contamination of the materials. The hydrogen gas seals the void space against the entrance of any undesirable gas such as oxygen, and the flow of hydrogen maintains the level of radioactivity in the void spaces relatively low. The hydrogen discharged from the most contaminated tank is catalytically burned to water so as to materially reduce the storage requirement for the seal gas. In a preferred reactor system, the primary feed water is saturated with free hydrogen gas to reduce decomposition of the primary water and thus reduce the presence of radiolytic oxygen. Thus, vent gases from the primary system and blowdown operation have a relatively high content of hydrogen. The vent gases from the primary system and blowdown operation are also passed through the metal oxide catalyst for combustion after first having been passed over a heated metal catalyst to combine any trace of oxygen with the catalyst or the hydrogen content of the gases. The remaining hydrogen will also be burned to water in the heated metal oxide catalyst by actual consumption of the oxygen in the contact material, so as to decrease the storage requirement for vent gases, in favorable cases to one percent or less of the previous volume. The residual gases and water from the metal oxide catalyst are then separated and sent to storage for decay. It will be apparent that the integrated process of this invention, which provides compatible saturation of the feed water and handling of primary vent gas and storage tank seal gas, also materially reduces the storage volume requirement for the vent gases and seal gas.

A more detailed understanding of the invention may be had from a consideration of the following description when taken in connection with the accompanying schematic drawing of a vent gas handling and storage tank sealing and purging system incorporating the present invention.

With reference to the drawing, a sealing and purging system incorporating the present invention includes a hydrogen saturator 10 comprising a vessel for containing primary feed water for the reactor. A feed water inlet conduit 12 and a feed water outlet conduit 14 are connected to the saturator. The saturator also includes a manifold 16 having a plurality of outlets or nozzles 18. The manifold 16 and nozzles 18 are disposed below the water level in the saturator. The manifold is connected to a source (not shown) of pressurized pure hydrogen by a conduit 20 so that pure hydrogen will be passed through the feed water to saturate the feed water with dissolved free hydrogen. The hydrogen saturation of the feed water is preferably carried out under atmospheric or slightly superatmospheric pressure, for example up to 5 p.s.i.g., in order to obtain a desired concentration of 20 to 40 cc. of dissolved free hydrogen per liter of feed water. As is known, such a concentration of dissolved free hydrogen in the feed water will tend to suppress decomposition of the water caused by exposure of the water to severe radiation and thus reduce the radiolytic oxygen content in the system. As mentioned above, the presence of excess hydrogen or helium in the primary feed water is not disadvantageous as is the presence of other gases.

The flow of hydrogen into the saturator 10 is maintained at a rate in excess of that necessary for the desired saturation of the feed water. In accordance with this invention, this excess hydrogen is carried from the saturator 10 by a conduit 22 leading to a tank for the storage of pure feed water prior to its introduction into the hydrogen saturator. The hydrogen is introduced into the pure water storage tank above the level of the water, where it is used as a seal gas to prevent contamination of the pure water by undesirable gases. The hydrogen gas space in the pure water storage tank is connected by a conduit 24 to the seal gas space in a holding tank for contaminated blowdown liquid. The hydrogen gas space in the blowdown water holding tank is connected by a conduit 26 leading to the seal gas space in a sludge or spent resin storage tank. The spent resin tank contains the contaminated residue of a purifying operation on blowdown water. The hydrogen gas space in the spent resin tank is connected by a conduit 28 to the inlet of a gas pump or blower 30 for providing a slow bleed of hydrogen through series connected seal gas spaces of the holding tanks.

The liquid level in the various tanks sealed by the hydrogen will, of course, vary; and the change in liquid level may be quite rapid, as in the case of the emptying of a tank. In order to provide a reservoir of sufficient hydrogen for use as a seal gas in the emptying of a tank and also to maintain a constant hydrogen pressure of a few inches of water, a suitable gas holder 29 is connected to the conduit 28. Normally there will be a slow accumulation of hydrogen in the portions of the system leading to the conduit 28. This accumulation must, of course, be disposed of as a normal system requirement. Additionally, the seal gas in the storage tanks will eventually become contaminated. Therefore, it is desirable to maintain a slow bleed of gas from the conduit 28 in order to compensate for the accumulated gas as well as to maintain a low level of radioactivity in the seal gas in the storage tanks and reservoir gas in the gas holder. The blower 30 previously described accomplishes this controlled bleed of gas from the conduit 28. The outlet of the blower 30 is connected to a conduit 32 leading to a reducible metal oxide catalytic chamber 34. The reducible metal oxide catalyst may be any suitable material such as copper oxide, chromium oxide, or zinc chromate. The hydrogen is passed over the catalyst, which is heated so that the hydrogen content of the gas in the conduit 32 is burned to water. Thus, there is eliminated the large storage volume for seal gas which is normally required.

The hot vent gases released from the primary system are carried by a conduit 48 to a main conduit 52. Further, in the operation of the reactor a portion of the blowdown liquid from the primary loop is normally flashed to release undissolved gases from the blowdown, and this vent gas from the blowdown flashing step is carried by a conduit 50 to the main conduit 52. The main conduit 52 is also connected to a source of pressurized steam which provides a stream of steam for sweeping the vent gases through the conduit 52 and minimizing accumulation of raioactive particles in the conduit 52. The gases in the conduit 52 will contain hydrogen, steam, and traces of oxygen as well as nitrogen and other radioactive components. The conduit 52 conducts the hot gases to a condenser 54 having cooling water inlet and outlet conduits 56, 58, respectively. Any condensible liquid in the gas is carried out of the condenser 54, along with the separated gases, through a conduit 60. The condensate is removed from the conduit 60 by a suitable trap or separator (not shown) and carried off through a conduit 62. The remaining gases are passed through a flame arrestor 64 and over a heated solid metallic catalyst 66 for the removal of any oxygen in the gas by the combination of the oxygen with the catalyst or with the hydrogen content of the vent gas. The oxygen reducing catalyst may be copper, palladium, platinum or other suitable metal. The oxygen-free gas is then preferably cooled and the condensate removed by suitable means (not shown) whereupon the dry gas is fed into the conduit 28 through a conduit 68 adjacent the inlet of the pump 30.

The connection of the conduit 68 to the conduit 28 adjacent the inlet of the pump and downstream of the conduit 32 to the gas holder assures that all of the effluence from the catalytic deoxygenator 66 will pass through the blower for disposal. This is desirable since this gas is more radioactive as compared with the seal gas. However, some gas from the gas holder and/or conduit 28 is continuously carried off by the blower 30, as a slow bleed, in order to control the total hydrogen content in the storage tanks and gas holder and to maintain a low level of radioactivity in the storage tanks and gas holder. The residual gas from the catalyst means 66 thus passes through the blower 30 and is passed through the heated metal reducible oxide catalyst 34 so as to burn the hydrogen gas content to water, thus further reducing the storage volume required to hold the vent and blowdown gases from the primary system. The resulting vapor-gas mixture from the catalyst 34 is passed through a conduit 36 to a condenser 38 having cooling water inlet and outlet conduits 40, 42, respectively. The water in the water-gas mixture from the condenser is separated from the gas by a suitable separator or trap (not shown) in the condenser outlet conduit 44 and is passed off through a condensate drain conduit 46. The residual gas in the conduit 44 will consist of inerts such as nitrogen and helium plus radioactive components. The volume of residual gas will be sufficiently small that it can be absorbed on a carbon or other suitable absorbing material, or it may be liquified or stored as mildly compressed gas so as to materially reduce the storage volume requirements for the storage tank seal gas.

Thus, it can be seen that there has been provided a novel method and apparatus for maintaining an oxygen-free atmosphere in the void spaces of storage tanks for pure water, contaminated blowdown water, and contaminated resin or sludge, and for reducing the volume of seal and vent gases which must be stored for decay periods, through the use of a hydrogen seal gas circulating and destruction system which is compatible with the hydrogen saturation of the primary feed water. The saturation of the pure water feed with hydrogen rather than helium in a reactor system incorporating this invention provides the advantage that the reactor vent gases will be composed largely of hydrogen which may then be combined catalytically with any trace-free oxygen in the vent gas for removal of the oxygen as water. The remaining contaminated hydrogen will be catalytically burned to water in the same catalytic means as the discharged seal gas so that it need not be stored as a gas. The use of excess hydrogen from the feed water saturation step as the seal gas for the storage tank provides further integration of the hydrogen saturation and seal gas processes. The sweep of hydrogen through the contaminated storage tanks assures an oxygen-free atmosphere of low level radioactivity with the added advantage that the sweep gas may be catalytically burned to alleviate the storage problem attendant to the use of air or the like as a purging and sweep atmosphere.

Although hydrogen is normally considered a relatively dangerous material to handle because of the explosion problem, it will be appreciated that equipment such as used in a nuclear reactor must of necessity be as near leakproof as possible in order to avoid the greater hazard of radioactivity. The attendant increased quality of workmanship and design of equipment for nuclear reactor systems, therefore, makes the hydrogen handling problem rather insignificant. Thus, the distinct advantages gained from the system of this invention far outweigh any minor handling problems of the hydrogen.

Having thus described my invention, I claim:

1. A method of sealing and purging the void spaces of a plurality of storage tanks in a water reactor system wherein each tank contains a quantity of radioactive material comprising the steps of continuously passing hydrogen gas through said void spaces in series and in ascending order of the degree of contamination of the material in the tanks to maintain the void spaces filled with hydrogen gas and at the same time to maintain a relatively low level of radioactivity in said void spaces, and continuously passing the hydrogen gas discharged from the tank containing the most contaminated material over a heated reducible metal oxide catalyst to burn the hydrogen gas to water thereby reducing the storage volume requirements for the radioactive sealing and purging gas.

2. In a pressurized water reactor system of a type having a pure water feed and providing radioactive aqueous residues; a plurality of storage tanks respectively containing pure feed water and radioactive aqueous residues of varying degrees of radioactive contamination, each of said tanks having a void space above the material therein, and means providing gas sealing and purging of the storage tanks comprising conduit means connecting the void spaces of said tanks in series and in ascending order with respect to the degree of contamination of the materials therein, a source of pure hydrogen gas connected to the void space of the tank having the least contaminated material, a gas holder connected to said conduit means and assuring that said void spaces are filled with hydrogen, gas pumping means having an inlet connected to the void spaces of the tank containing the most contaminated material and having an outlet, said pumping means providing a continuous bleed of hydrogen through the void spaces in said storage tanks, heated reducible metal oxide catalytic combustor means having an inlet connected to the outlet of said pumping means and having an outlet, and water condensing and gas separating means having an inlet connected to said outlet of said catalytic combustor means and having a water condensate outlet and a gas outlet.

3. In a pressurized water reactor system of a type having a pure water feed and providing radioactive aqueous residues; a plurality of storage tanks respectively containing pure feed water and radioactive aqueous residues of varying degrees of radioactive contamination, each of said tanks having a void space above the material therein, a source of pure water for the reactor system including a hydrogen saturator in which purified feed water is contacted with pure hydrogen to provide an excess of hydrogen in the feed water, said hydrogen saturator providing hydrogen in an amount in excess of that required to saturate the feed water, a conduit connecting the hydrogen saturator to the void space of the storage tanks for pure feed water for purging and sealing of the void space of the pure feed water storage tank with hydrogen, conduit means connecting the void space of the purified feed water storage tanks and the remaining storage tanks in series and in ascending order of the degrees of contamination of the materials contained therein for hydrogen purging and sealing of said remaining tanks, a gas holder connected to said conduit means to assure that all of said storage tanks are filled with hydrogen, gas pumping means having an inlet connected to said conduit means nad having an outlet, said gas pumping means providing a continuous flow of hydrogen through the void spaces of all of said tanks, heated reducible metal oxide catalyst means for burning the hydrogen passed by said gas pumping means to water, said catalyst means having an inlet connected to the outlet of said pumping means and having an outlet.

4. In a water reactor system of a type having a pure water feed, providing radioactive aqueous residues, having means for providing venting of gases in the primary loop and having blowdown means for the water in the primary loop including means for separating gases from the blowdown water from the primary loop; the combination of a hydrogen saturator for saturating the primary feed water for the reactor with undissolved free hydrogen gas by contacting the feed water with pure hydrogen, said saturator providing hydrogen in excess of that required for saturation of the feed water, a plurality of storage tanks respectively containing purified feed water for the primary loop and radioactive aqueous residues of varying degrees of contamination, each of said storage tanks having a void space above the materials therein, and means providing gas sealing and purging of said storage tanks and providing an effective reduction in the volume storage requirements for the gas used in sealing and purging said storage tanks as well as for the primary loop vent gases and the gases separated from the blowdown water comprising a conduit connecting the hydrogen saturator with the void space in the storage tank for the purified feed water, conduit means connecting the void space of the purified water storage tank with the void spaces in the remaining storage tanks in series and in ascending order of the degree of contamination of the material in said storage tanks, a gas holder connected to said conduit means to assure that said void spaces remain filled with hydrogen, gas pumping means having an inlet connected to said conduit means and having an outlet, said pumping means maintaining a bleed of hydrogen gas through said void spaces, heated reducible metal oxide catalyst means for burning to water the hydrogen passed by said pumping means, said catalyst means having an inlet connected to the outlet of said pumping means and having an outlet, water condensing and separating means having an inlet connected to the outlet of said catalyst means and having a water condensate outlet and a gas outlet, second conduit means for conducting the primary vent gases and gases separated from the blowdown water, second water condensing and gas separating means having an inlet connected to said conduit means and having a gas outlet for conducting gases separated from any liquid in said second conduit means, oxygen reducing catalyst means of a heated metal type having an inlet connected to the gas outlet of said second condensing and separating means for removing any oxygen in the gases passed therethrough, said oxygen reducing catalyst means further having an outlet connected to the inlet of said pumping means to provide that the hydrogen and said vent gases and gases separated from the blowdown water will be burned to water.

5. An integrated and compatible method of gas purging and sealing the void spaces of a plurality of storage tanks associated with a pressurized water reactor system and containing radioactive aqueous material of varying degrees of radioactive contamination and of materially reducing the volume storage requirements for the contaminated gas used in said gas sealing and purging and the blowdown gases in the system which result from the venting of gases from the primary loop and from the separation of gases from water blown down from the primary loop; said method comprising saturating the primary loop feed water for the reactor with hydrogen to reduce decomposition of the primary water, passing the primary vent and blowdown gases over an oxygen reducing heated metal catalyst to eliminate the oxygen in these gases, continuously passing hydrogen through said void spaces in series and in ascending order of the degree of contamination of the radioactive material in the tanks to maintain the void spaces filled with hydrogen gas and at the same time to maintain a relatively low level of radioactivity in said void spaces, and passing the vent and blowdown gases from which oxygen has been eliminated and the gas discharge from the most contaminated of said storage tanks over a heated reducible metal oxide catalyst to burn the hydrogen gas to water.

6. A method of sealing and purging the void spaces of a plurality of tanks containing radioactive aqueous residues from a pressurized water reactor system comprising the steps of filling said void spaces with hydrogen gas, continuously removing a controlled amount of the gas in each void space while maintaining the space filled with hydrogen gas, and continuously passing the removed hydrogen gas over a heated reducible metal oxide catalyst to burn the hydrogen gas to water and thereby reduce the storage volume required for the radioactive sealing and purging gas.

References Cited in the file of this patent

UNITED STATES PATENTS 2,847,284    Busey _____ Aug. 12, 1958

OTHER REFERENCES

The Reactor Handbook, vol. 2, Engineering, May 1955. Page 187. Pub. by U.S. Atomic Energy Com.

Proceedings of the Second United Nations International Conference on the Peaceful Uses of Atomic Energy, vol. 8, United Nations, Geneva, 1958. Pages 502, 503, 504, 505.